UNITED STATES PATENT OFFICE.

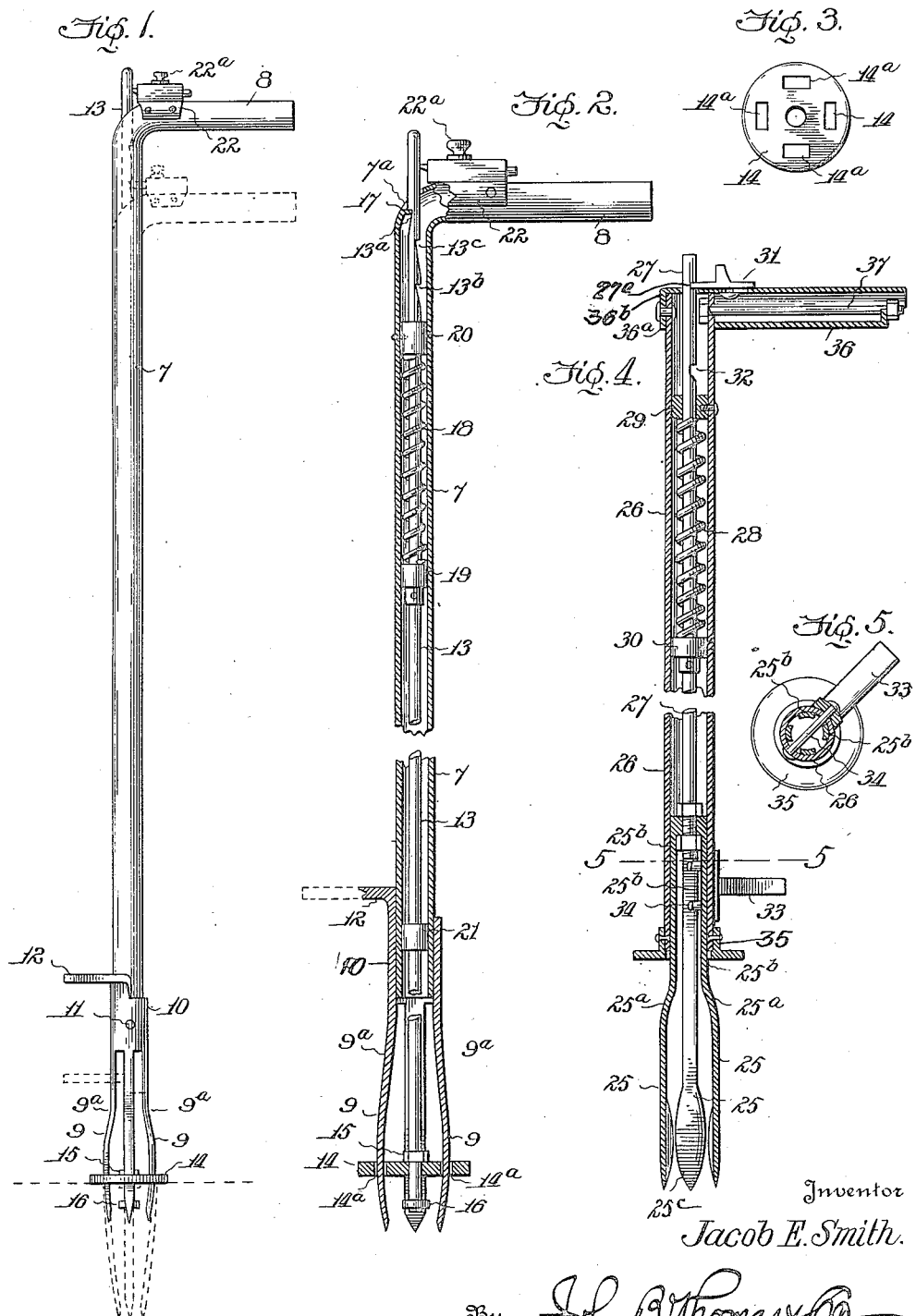

JACOB EDWIN SMITH, OF HOMESTEAD, PENNSYLVANIA.

WEED-DIGGING IMPLEMENT.

1,225,188.

Specification of Letters Patent.

Patented May 8, 1917.

Application filed May 11, 1916. Serial No. 96,927.

*To all whom it may concern:*

Be it known that I, JACOB EDWIN SMITH, a citizen of the United States, and a resident of Homestead, in the county of Allegheny and State of Pennsylvania, have invented a Weed-Digging Implement, of which the following is a specification.

The primary object of my invention is to provide an implement for removing weeds by digging them root and branch out of the ground, providing a circular series of narrow blades or tines, at the end of a rod or staff, which are forced into the ground by foot pressure to penetrate alongside the main root and close thereon, whereby the entire weed may be pulled out with the removal of as little earth as possible.

The invention contemplates the production of an implement of this character in which the cutting blades or tines when forced into the ground converge around the root and are held tightly closed thereon so that the whole weed may be removed with said blades or tines, and provides for mechanically opening the blades and ejecting or pushing the weed out from between the same when the device for holding the blades closed is released, greatly facilitating the operation of removing weeds from a lawn or garden and permitting the operator to perform the operation in a standing position.

The invention also contemplates the adaptation of the implement for the purpose of digging post-holes by increasing the width of the lower ends of the cutting blades and spacing them in such manner that they will act as scoops to cut into and remove a quantity of earth to form a hole of the desired size and depth.

Other objects and advantages of my invention will hereinafter appear, and what I particularly claim as my invention and desire to protect by Letters Patent is more specifically set forth in the appended claims.

In the accompanying drawings, forming a part hereof:

Figure 1 is a side view of a weed digging implement constructed in accordance with my invention.

Fig. 2 is a vertical sectional view thereof, enlarged.

Fig. 3 is a detail plan view of the spreader-plate for opening and closing the blades or tines.

Fig. 4 is a side view showing a modification, in which the blades are widened for digging post-holes.

Fig. 5 is a sectional view, on the line 5—5 of Fig. 4.

Like numerals of reference indicate like parts in all the figures of the drawings.

In carrying out my invention I provide a hollow rod or staff 7, of a suitable length, provided at its upper end with a handle 8, and at its lower end with a series of cutting blades or tines 9, the latter being disposed vertically and sharpened at their lower ends to easily enter the ground around the weed. In the present instance this rod or staff is made of a metal tube, the handle 8 being formed by bending said tube so that the upper end portion thereof will project at right angles to the body, and the blades or tines 9 are connected to the lower end of the tubular rod by means of a sleeve 10, with which said blades or tines are formed integrally, the sleeve fitting over the tube and firmly secured thereto by means of rivets 11. This fixed sleeve is provided with a narrow extension 12, projecting at right angles from the rod to form a foot piece by which pressure of the foot may be applied to assist in forcing the blades or tines into the ground.

Extending longitudinally through the tubular rod or staff, so as to work therein, is a rod or shaft 13, which projects out at the lower end of said tube to lie between the cutting blades, and upon this shaft is loosely mounted a spreader-plate 14, having apertures 14ª through which said cutting blades pass. The spreader-plate is held on the lower end of the shaft by means of a nut 15 and disk 16, spaced a short distance apart, as shown in Fig. 2, so that the spreader-plate will have a limited movement between them, for the purpose hereinafter explained.

The upper end of the shaft 13 passes through an opening 7ª at the bent upper end of the tubular rod 7, and at the lower end of this opening is a short lug 17 for engagement with a notch 13ª in one side of said shaft to limit its downward movement with respect to the tubular rod, and in order to actuate the shaft in this direction to locate the spreader-plate normally near the outer ends of the blades or tines a strong helical spring 18 is coiled on the shaft between a collar 19 fixed thereon and a sleeve 20 secured in the tubular rod, the shaft of course working loosely through said sleeve. To center the lower portion of the shaft in the tubular rod a collar 21 is fixed on said shaft to work in the tube.

The blades or tines extend from the attaching-sleeve 10 in a straight line for a certain distance, to 9ª, and then curve slightly outwardly and inwardly to the points, passing through the spreader-plates, as hereinbefore stated, whereby when the blades or tines are forced into the ground by depressing the tubular rod the spreader-plate resting on the ground and held stationary will act to close the lower ends of said blades or tines by spreading apart the upper or straight portions thereof. It will be noted that this closing action of the tines is gradual so that they will follow down the root of the weed, and that they finally converge to bring the points closer together to remove root and branch when the implement is removed or pulled out of the ground.

In this operation as the spreader-plate and shaft to which it is attached are held stationary the tubular rod moves down the shaft compressing the spring and projecting the upper end of said shaft beyond the tubular rod, and in order to hold the parts in this position with the weed confined between the blades or tines an ordinary spring-catch 22 is secured on the handle so that the spring-actuated bolt thereof will engage either one of the notches 13ᵇ or 13ᶜ in said shaft, according to the extent to which the blades or tines are forced into the ground. After the implement, with the confined weed, has been pulled out of the ground the weed may be quickly ejected from between the blades by simply manipulating the catch to release the shaft, the spring in this instance moving the shaft downwardly in the tube to project the spreader-plate toward the outer ends of the blades or tines, and as the disk 16 moves away from the plate it gives a final push to the weed clearing it from the points of the tines. It will be noted, therefore, that the spreader-plate not only serves to direct the blades or tines in their digging operation but also acts as an ejector. By this arrangement the operator may stand in an erect position in digging or grasping the weed by the implement and freeing the implement of the same after it has been removed from the ground, and it is apparent the operation may be effected quickly and at a minimum expense of labor.

It will also be seen that the implement is very simple in construction, and that the operation is positive and easily and quickly accomplished.

The implement may be used also for the purpose of digging postholes, in which instance the operation may be identical with that of digging out weeds, it being necessary only to increase the width of the lower ends of the blades in the shape of spades or scoops, as suggested in the modification I have illustrated in Fig. 4 of the drawings. As shown in this figure the blades 25, extending from the attaching-shanks 25ᵇ are widened or oval-shaped, as at 25ᶜ, and sharpened along the lower curved edge to cut into the ground. The earth removed or loosened by the cutting action of the blades 25 will be confined between the blades as the latter are withdrawn from the ground, and the earth so removed may be ejected in substantially the same manner as heretofore described in ejecting a weed. In this instance the device would of course be made a little larger than the implement for digging weeds. Therefore in the claims where I use the term "blades" or "tines" it will be understood to cover also the provision of blades such as illustrated in Fig. 4, or of any other shape for an analogous purpose.

The modification also shows an arrangement by which the blades are carried by the rod 27, instead of the tube, as 26, and in this instance the lower portions of said blades are brought together to clamp them on the weed or earth by reason of the lower end of the tube riding on the outwardly curved portions 25ª of said blades. The blades, in this instance, are projected beyond the tube by a strong helical spring 28, confined between collars 29 and 30, and when the tube is moved downwardly on the blades, compressing the spring, the parts are held by a sliding catch 31 engaging notch 32. The blades are forced into the ground and the tube depressed to clamp the blades on the material by means of a foot-piece 33 fixed to the lower portion of the tube by rivets 34, which latter pass between the shanks 25ᵇ of the blades. In forcing the blades into the ground said blades and the shaft carrying the same are held rigidly with respect to the tube by the catch 31 engaging a notch 27ª near the upper end of the shaft (as shown in Fig. 4), and when the blades have entered the ground to the desired depth the catch is disengaged and pressure on the foot-piece 33 will depress the tube on the shaft and blades closing the latter on the earth displaced, this latter operation compressing the spring and permitting the catch to be moved into the notch 32 to hold the blades compressed. When the implement is removed from the hole and the catch released the spring will act to project the blades and release the earth from between the same. The lower end of the tube in this instance is reinforced by a ferrule 35 flanged to form an annular plate which contacts with the ground in the operation of digging.

Fig. 4 also shows another way of providing a handle for the tube, in which a short pipe section 36 is employed and secured to the upper end of the tube by a bolt 37, a portion of the short pipe extending across the upper end of the tube and having a tongue 36^b bent upon said tube and riveted thereto, as at 36^a.

It will be noted that in the modification the lower end of the tube acts as a spreader, after the manner of the spreader-plate in Figs. 1 and 2.

Having described my invention, I claim:

1. In a digging implement for the purposes set forth, the combination of a tubular rod, blades at the lower end thereof, a spreader through which the blades pass, and a spring-actuated rod for moving the spreader with respect to the blades.

2. In a digging implement for the purposes set forth, the combination of a tubular rod, blades at the lower end thereof, a spreader through which the blades pass, a spring-actuated shaft for moving the spreader with respect to the blades, and means for holding the shaft against the action of the spring.

3. In a digging implement for the purposes set forth, the combination of a tubular rod having blades projecting from the lower end thereof, a spreader-plate through which the blades pass, a spring-actuated shaft carrying the spreader-plate and having notches therein, and a catch on the tubular rod to engage the notches and hold the shaft against the action of the spring.

4. In a digging implement for the purposes set forth, the combination of a tubular rod having blades projecting from the lower end thereof, a shaft extending through the tubular rod and between the blades, a spreader-plate loosely mounted on the shaft to have a limited movement at the outer end thereof, and a disk at the outer end of said shaft.

5. In a digging implement for the purposes set forth, the combination of a tubular rod bent into a handle at its upper end, a foot piece near the lower end of the rod, and blades projecting downwardly from said rod, together with a spreader-plate through which the blades pass, and means for connecting the spreader-plate movably with respect to the rod.

6. In a digging implement for the purposes set forth, the combination of a tubular rod bent into a handle at its upper end, a foot piece near the lower end of the rod, and blades projecting downwardly from said rod, together with a shaft movable in the tubular rod and having notches, a spreader-plate on the lower end of the shaft, a spring for actuating the shaft in one direction, and a catch engaging the notches in said shaft.

JACOB EDWIN SMITH.

-Witnesses:
  EARL D. HAYS,
  LAWRENCE E. LEWIS.